(12) United States Patent
Jha et al.

(10) Patent No.: US 12,479,092 B2
(45) Date of Patent: Nov. 25, 2025

(54) SYSTEM AND METHOD FOR LEARNING SEQUENCES IN ROBOTIC TASKS FOR GENERALIZATION TO NEW TASKS

(71) Applicant: Mitsubishi Electric Research Laboratories, Inc., Cambridge, MA (US)

(72) Inventors: Devesh Jha, Cambridge, MA (US); Diego Romeres, Cambridge, MA (US); Daniel Nikovski, Cambridge, MA (US)

(73) Assignee: Mitsubishi Electric Research Laboratories, Inc.

( * ) Notice: Subject to any disclaimer, the term of this patent is extended or adjusted under 35 U.S.C. 154(b) by 230 days.

(21) Appl. No.: 18/048,271

(22) Filed: Oct. 20, 2022

(65) Prior Publication Data

US 2024/0131698 A1 Apr. 25, 2024
US 2024/0227179 A9 Jul. 11, 2024

(51) Int. Cl.
*B25J 9/16* (2006.01)
*B25J 13/08* (2006.01)

(52) U.S. Cl.
CPC .............. *B25J 9/163* (2013.01); *B25J 9/1664* (2013.01); *B25J 9/1671* (2013.01); *B25J 13/085* (2013.01);
(Continued)

(58) Field of Classification Search
CPC ........ B25J 9/163; B25J 9/1664; B25J 9/1671; B25J 13/085; G05B 2219/23246;
(Continued)

(56) References Cited

U.S. PATENT DOCUMENTS

2015/0336268 A1* 11/2015 Payton ................. G05B 19/423
901/3
2022/0126445 A1* 4/2022 Zhu ........................ B25J 9/1635

OTHER PUBLICATIONS

Niekum S, Osentoski S, Konidaris G, Chitta S, Marthi B, Barto AG. Learning grounded finite-state representations from unstructured demonstrations. The International Journal of Robotics Research. 2015;34(2):131-157 (Year: 2015).*

(Continued)

*Primary Examiner* — Adam R Mott
*Assistant Examiner* — Matthew C Gammon
(74) *Attorney, Agent, or Firm* — Gene Vinokur

(57) ABSTRACT

A robotic controller is provided for generating sequences of movement primitives for sequential tasks of a robot having a manipulator. The controller includes at least one control processor, and a memory circuitry storing a dictionary including the movement primitives, a pretrained learning module, and a graph-search based planning module having instructions stored thereon. The controller to perform steps acquiring a planned task provided by an interface device operated by a user, wherein the planned task is represented by an initial state and a goal state with respect to an object, generating a planning graph by searching a feasible path of the object for the novel task using the graph-search based planning module and selecting movement primitives from the dictionary in the pretrained learning module, wherein the pretrained learning module has been trained based on demonstration tasks, parameterizing the feasible path represented by the movement primitives as dynamic movement primitives (DMPs) using the initial state and goal state, and implementing the parameterized feasible path as a trajectory according to the selected movement primitives using the manipulator of the robot by tracking and following the parameterized for the planned task.

7 Claims, 11 Drawing Sheets

(52) U.S. Cl.
CPC ............. *G05B 2219/23246* (2013.01); *G05B 2219/40395* (2013.01)

(58) Field of Classification Search
CPC ........... G05B 2219/40395; G05B 2219/39244; G05B 2219/40114
See application file for complete search history.

(56) References Cited

OTHER PUBLICATIONS

Borràs, Júlia, Guillem Alenyà, and Carme Torras. "Encoding cloth manipulations using a graph of states and transitions." arXiv preprint arXiv:2009.14681 (2020). (Year: 2020).*

H. Tan, "Learning External and Internal Constraints of Behaviors for Robotic Task and Motion Planning," 2018 IEEE International Conference on Systems, Man, and Cybernetics (SMC), Miyazaki, Japan, 2018, pp. 3793-3800 (Year: 2018).*

Scott et al. Learning grounded finite state representations from unstructured demonstrations. vol. 34, No. 2, 2014-12016.

* cited by examiner

SYSTEM AND METHOD FOR LEARNING SEQUENCES IN ROBOTIC TASKS FOR GENERALIZATION TO NEW TASKS

TECHNICAL FIELD

This invention relates to learning sequences in a sequential task, and more particularly to methods and apparatus for learning sequences in robotic tasks in order to perform novel robotic tasks using these learned sequences and failures observed during demonstrations.

BACKGROUND OF THE INVENTION

The field of machine learning and artificial intelligence has witnessed huge improvements and achievements in the fields of computer vision and natural language processing. However, these algorithms suffer in data efficiency when used for robotic applications, and thus become impractical to use for a lot of robotic applications. Learning from demonstration (LfD) is a data-efficient learning technique where a robot can learn to perform tasks by first recording several demonstrations of the task and then re-creating these demonstrations using an appropriate machine learning model.

In LfD, a robot is provided one or several demonstrations of a desired task. A demonstration could be provided by either a human or a programmed controller for a known task. In case the demonstration is provided by a human, the human can provide demonstration either directly on the robot or by performing the task himself. In the latter case, the human motion can be recorded using either a motion capture system or a vision system consisting of one or multiple cameras. On the other hand, if a human provides the demonstration directly on the robot, the human can provide a demonstration by either moving the robot using kinesthetic teaching or by teleoperation by using an appropriate device. In all these cases, the movement of the robot and the objects being manipulated by the robot are observed and recorded. This data is then used to learn or represent the movement of the robot while performing the task that was shown to the robot.

LfD techniques are used widely to reduce programming of robots and allowing unskilled workers to demonstrate tasks on the robot. The robot can then use a standard LfD technique to recreate the tasks and perform autonomously without the need of explicit human programming. A learned LfD representation for performing a task is referred to as a skill. However, a lot of useful robotic tasks are sequential in nature. For example, consider the task of assembly of an electronic item. Such a task would require that robot can put together all the different pieces of the electronic item in the desired sequence to assemble the complete item. It is also desirable that the robot be able to use the learned skills to assemble any new electronic item using the same subset of operations in a particular order.

In order to learn, the LfD technique autonomously performs these long-horizon tasks, two key elements are required. First the demonstration must be sequenced into the different sequences or sub-tasks while performing the full task. Then these individual sequences or sub-tasks could be learned using a suitable machine learning model while parameterized by some parameters of the task. These learned models of the sub-tasks are called skills. Secondly, the robot should optimize the sequence of these skills based on a new task that the robot needs to perform. The new task could be performed using the learned skills in a particular, unknown sequence by using all or subset of the skills that was learned in the first part.

Thus, there is a need for methods than can automatically decompose long demonstrations into meaningful sequences, and then compose these sequences optimally in order to perform a novel task.

SUMMARY OF THE INVENTION

Some embodiments of the proposed disclosure are based on the realization that it is difficult to design controllers for long-horizon tasks, sequential tasks. This is mainly because the search space for a feasible solution is too big, and thus an optimization-based technique fails to find a solution. Reinforcement learning (RL) can probably find a solution-however, this would require careful design of rewards and enormous amount of data to be able to guide an RL agent to learn a solution. Such a technique would be very inefficient as it would require prohibitive amount of data. Furthermore, reward engineering for complex tasks is a very difficult problem.

Some embodiments are based on the realization that learning from demonstration (LfD) could be a useful to learn efficient controllers for performing long-horizon, sequential tasks. The reason being that the robot can get an idea of how to perform the task from an expert being it either a human or a controller. The robot can use an appropriate learning method (e.g., dynamic movement primitives, SEDS, etc.) However, there are challenges that need to be solved when using LfD for long-horizon tasks for robots. For example, it is difficult to learn the full task as a single motor skill if it consists of several steps that need to be finished for the task to be successful. Thus, it is essential that the robot need to identify sequences in the long horizon task that has been demonstrated to the robot.

It is an object of some embodiments to provide a system and a method for identifying sequences in demonstrations for performing long-horizon, sequential tasks. Some embodiments of this invention are based on the realization that segmentation of task trajectories would depend on the feature representation for the demonstrated trajectory.

It is an object of some embodiment to provide a system and method that can detect appropriate features which can be used for sequence identification in the demonstrated trajectories. This problem is like feature identification or feature selection which can be applied to the collected demonstrations for the robot so that we can then use it for trajectory segmentation. This method can allow better segmentation of demonstration trajectories.

Additionally or alternatively, it is an object of some embodiment to provide a system and method that can detect the appropriate features from the data to correctly identify different sequences and change between different sequences. Additionally or alternatively, it is an object of some embodiment to provide a system and method that can fit a machine learning model into each of the identified sequences, parameterized by some parameters of the task. Additionally or alternatively, it is an object of some embodiment to provide a system and method that can provide robustness to the detection of sequences using information from demonstration attempts that resulted in failure.

Additionally or alternatively, it is an object of some embodiment to provide a system and method that can generate an optimal sequence of performing a subset of these sequences in order to perform a novel task presented to the robot. Additionally or alternatively, it is an object of some embodiment to provide a system and method to implement the learned sequences for a task in a feedback fashion using an object-state detection framework.

According to some embodiments of the present invention, a robotic controller is provided for generating sequences of movement primitives for sequential tasks of a robot having a manipulator. The robotic controller may include at least one control processor; and a memory circuitry storing a dictionary including the movement primitives, a pretrained learning module, and a graph-search based planning module having instructions stored thereon that, when executed by the at least control processor, cause the robotic controller to perform steps of: acquiring a planned task provided by an interface device operated by a user, wherein the planned task is represented by an initial state and a goal state with respect to an object; generating a planning graph by searching a feasible path of the object for the novel task using the graph-search based planning module and selecting movement primitives from the dictionary in the pretrained learning module, wherein the pretrained learning module has been trained based on demonstration tasks; parameterizing the feasible path represented by the movement primitives as dynamic movement primitives (DMPs) using the initial state and goal state; and implementing the parameterized feasible path as a trajectory according to the selected movement primitives using the manipulator of the robot by tracking and following the parameterized for the planned task.

Further, some embodiments can provide a robotic controller for learning sequences of movement primitives for sequential tasks of a robot having a manipulator. In this case, the robotic controller may include at least one control processor; and a memory circuitry storing a dictionary including the movement primitives, and a learning module having instructions stored thereon that, when executed by the at least control processor, cause the robotic controller to perform steps of: collecting demonstration data from trajectories acquired via motion sensors configured to measure the trajectories of objects while the objects are being manipulated by an interface device operated by a user according to demonstration tasks, wherein each of the trajectories correspond to each of the demonstration tasks, wherein each of the demonstration task is represented by an initial state and a goal state with respect to each of the objects, wherein the collecting is continued until the user stops the demonstrated tasks; segmenting, for each of the demonstration tasks, the demonstration data into movement primitives by dividing the trajectories into primitive trajectories; and updating the dictionary using the movement primitives based on the collected demonstration data.

Yet further, according to some embodiments of the present invention, a robotic controller is provided for generating sequences of movement primitives for sequential tasks of a robot having a manipulator. The robotic controller may include at least one control processor; and a memory circuitry storing a dictionary including the movement primitives, a pretrained learning module, and a graph-search based planning module having instructions stored thereon that, when executed by the at least control processor, cause the robotic controller to perform steps of: acquiring, via an interface controller, demonstration data of one or more demonstration tasks provided by an interface device operated by a user for a planned task, wherein the planned task is represented by an initial state and a goal state with respect to at least one object being manipulated; each of the demonstration data is segmented into multiple segments by selecting features from the demonstration data based on a feature selection method and using a segmentation metric, wherein each of the multiple segments represents a subtask; generating a planning graph by searching a feasible path of the at least one object for the planned task using the graph-search based planning module and selecting movement primitives from the dictionary in the pretrained learning module, wherein the pretrained learning module has been trained based on collected demonstration data of training demonstration tasks; parameterizing the feasible path represented by the movement primitives as dynamic movement primitives (DMPs) using the initial state and goal state; and implementing the parameterized feasible path as a trajectory according to the selected movement primitives using the manipulator of the robot by tracking and following the parameterized feasible path for the planned task.

BRIEF DESCRIPTION OF DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Designing controllers for long horizon manipulation tasks remains very challenging in robotics. There are several reasons that makes the task challenging. First it is very difficult to find solutions to very long horizon control using either the model-based techniques or model-free RL-based approaches. Secondly, the success of the entire task depends on the success of each of the individual tasks. Hence, these problems require careful formulation, where the full task could be broken down into smaller subproblems and then make sure that the individual subproblems can be completed reliably. It is also desirable that to reduce the efforts in designing these controllers, a suitable learning-based method should be used which could be trained in a data-efficient manner and can be generalized to novel tasks. This disclosure presents a system and method that can be used to reduce programming burden for performing long-horizon tasks.

Reinforcement learning (RL)-based approaches have seen tremendous success in a lot of robotic manipulation tasks but they suffer from requirements on data during training and difficulty in training for long-horizon tasks. Thus, use of RL has been limited to short-horizon tasks where the robot can be trained with dense rewards, otherwise the approach becomes very data intensive. Learning from demonstration (LfD) provides an alternative learning-based approach which can make use of expert or human demonstrations for learning motor skills for different tasks. The system and method presented in this disclosure is motivated by this requirement where the proposed method is data efficient as well as reduces the effort on programming by experts.

Figure 1:
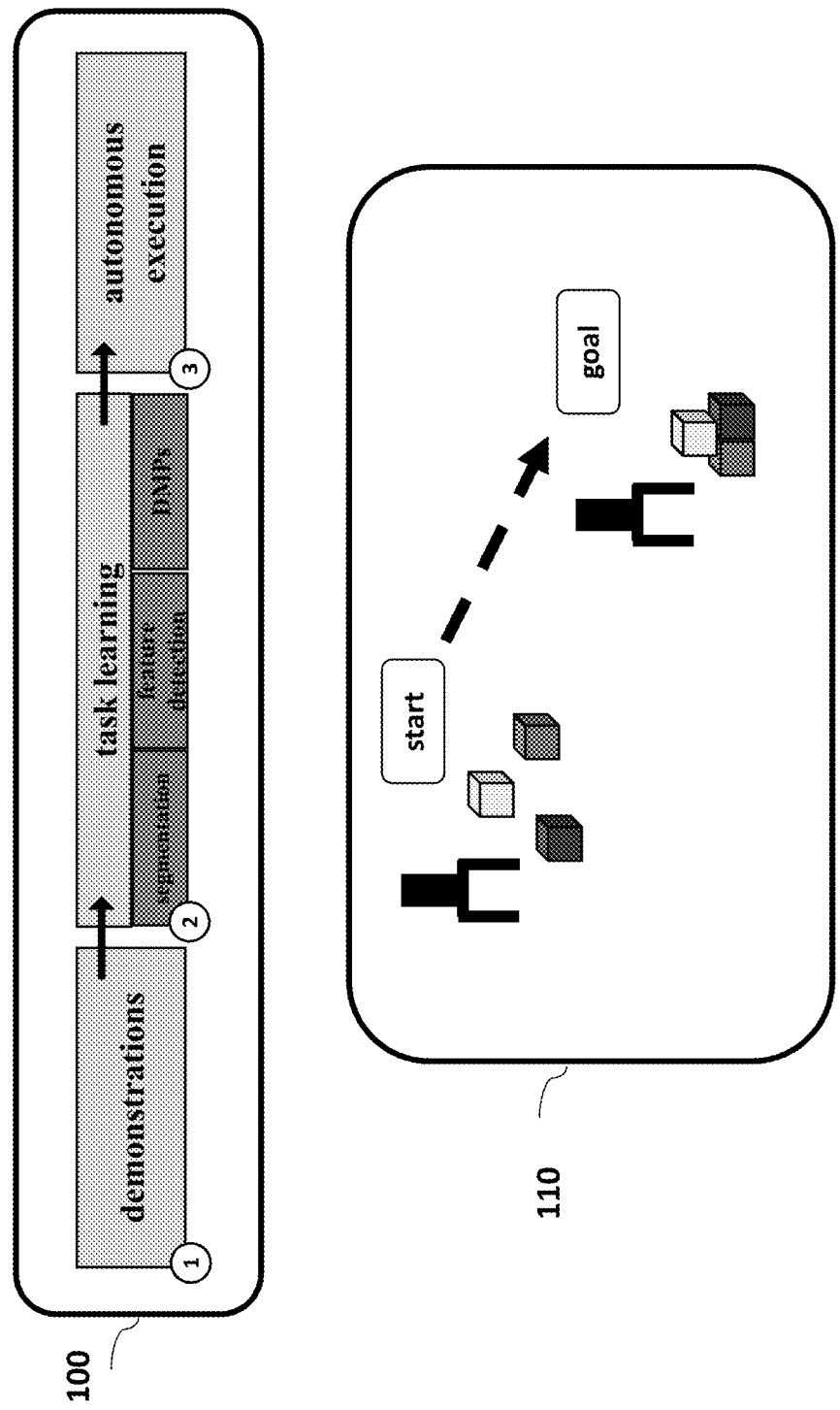
FIG. 1 shows a schematic representation of the general learning paradigm, according to embodiments of the present invention.

FIG. 1 shows a schematic 110 illustrating a block stacking task which is a sequential task which requires that a robot performs placement of individual blocks sequentially based on the position of the other blocks in the scene. In this task, the robot is presented with the blocks in its workspace such that the robot can observe the location of the blocks. The basic idea of the proposed learning is shown in 100. An expert user provides multiple demonstrations for performing the task. These demonstrations can then be segmented into individual segments using appropriate feature detection. These individual segments can then be represented as dynamic movement primitives (DMPs). Then the robot can use these DMPs for a new instance of the problem for autonomous execution.

Some embodiments are based on the realization that LfD approaches provide a data efficient alternative to RL-based approaches for designing learning-based controllers for long-horizon, multi-stage manipulation tasks. The robotic system could be equipped with a system for providing demonstrations to the robot for performing these tasks. This system can consist of at least one interface for moving the robot by an expert human. Some examples of such an interface could be 3-axis joystick, a space mouse, a virtual or augmented reality system. These interfaces can be used to remotely move the robot. Alternatively, an expert human can also demonstrate a task on the robot using a kinesthetic controller on the robot where the robot can be directly moved by applying force on the robotic arm.

Alternatively, the demonstration data could also be collected in simulation by creating a simulation environment similar to the physical environment and collecting demonstration data by moving the robot in the simulation environment using similar interfaces like a joystick or a virtual reality or augmented reality interface.

Figure 2A:
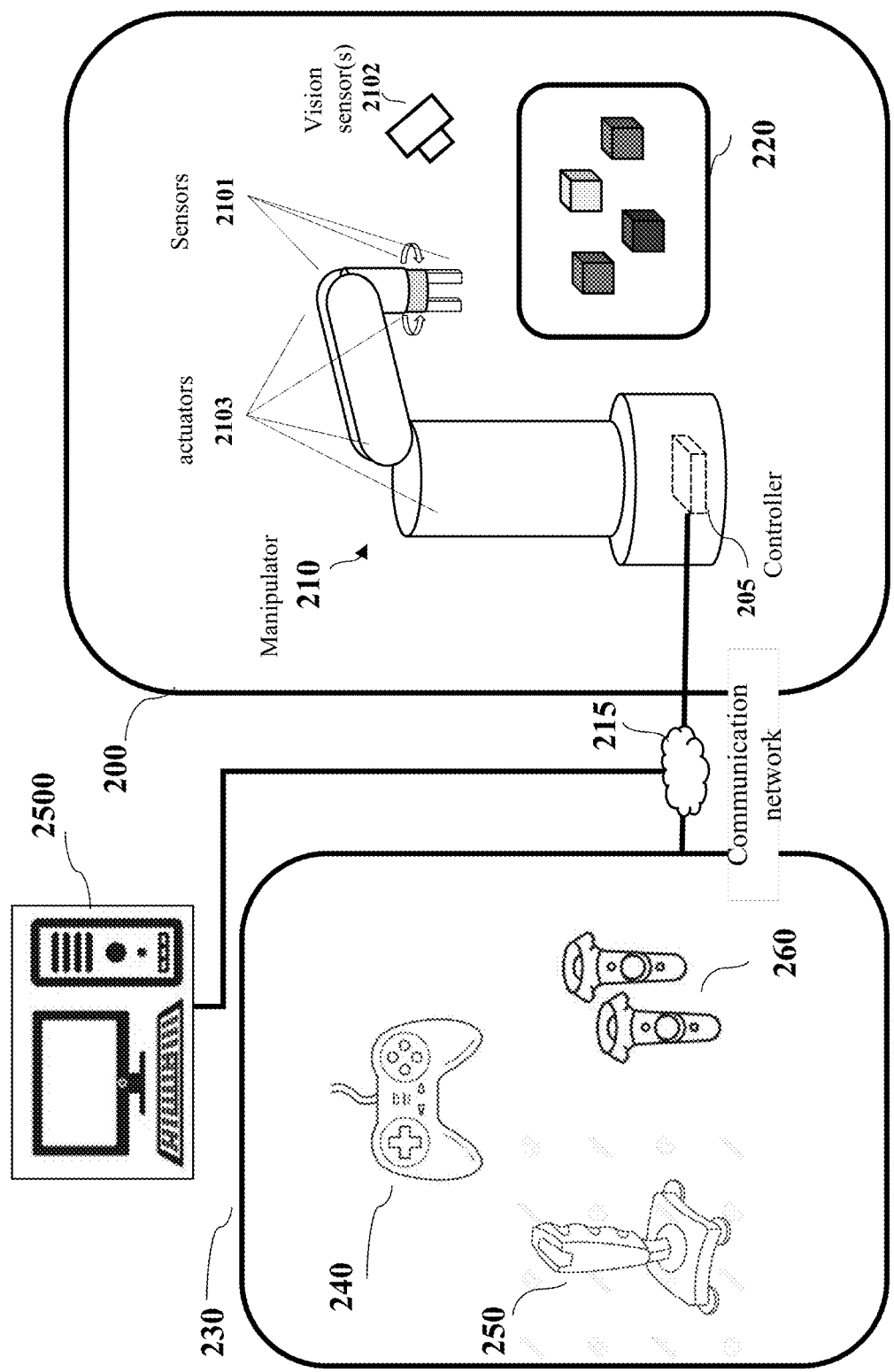
FIG. 2A shows a schematic of a robotic system where a robotic manipulator is controlled using several different interfaces, according to embodiments of the present invention.

FIG. 2A shows a robotic system 200 including a controller (robotic controller) 205 and a robotic manipulator 210 configured to stack blocks 220 into a desired shape. The controller 205 of the robotic system 200 is connected to an interface device 230 configured to be operated by a user/operator who demonstrates tasks of the robotic system 200 by use of the interface device 230. The robotic system 200 includes the robotic manipulator 210 with actuators 2103, sensors 2101 arranged on the robotic manipulator 210 including vision sensors (3D sensors) 2102. The motion sensors 2101 may include acceleration sensors, position sensors, torque sensors, and force sensors. The signals measured by the motion sensors 2101 are acquired by the controller 205 via interface controller 2110B that includes analogue/digital (A/D) signal convertor and digital/analogue (D/A) signal convertor. In this case, the interface device 230 includes a network interface (not shown) configured to connected to the controller 205 of the robotic system 200 via a communication network 215. In some cases, the communication network 215 may be a lined network or a wireless network. The interface device 230 is configured to control the robotic manipulator 210 via the controller 205 so that demonstration trajectories operated by the user are provided for learning the sequences of a robot task using signals from the sensors 2010 and the actuators 2103. For example, the interface device 230 can be any types of joysticks 240, 250 or 260 configured to be used/operated by a user/operator. The operator can also use a virtual reality game engine controller for moving the robot during these demonstrations. Note that these figures are not exhaustive, and a human can use other interaction modes for demonstrating tasks corresponding to the demonstration trajectories.

The kind of tasks that we are interested are long-horizon tasks which is a composition of several subtasks. We assume that an expert human provides several demonstrations of such long-horizon task. Note that during demonstrations, we record observations from different sensors available for the robotic system which could include encoders on the robotic arms, a vision system for tracking objects in the work environment of the robot, a force sensor to observe forces experienced by the robotic end-effector during a task demonstration. There could be other sensors that a robotic system might be equipped with other sensing modalities such as tactile sensors which could be provide more detailed information of contact-forces and moments during the demonstrated manipulation task at the fingers of the gripper. Thus, a demonstration trajectory is represented by the sequence of sensor trajectories that are collected by the robotic system during task demonstration. At any instant of time, we represent the state of the robotic system as the collection of the pose of the end-effector (or the gripper tip of the robot) and the pose of all the objects in the workspace of the robot.

FIG. 2A shows a controller 205 configured to control the manipulator 210 to demonstrate the sequence of steps used by the manipulator 210 of a robotic system 200 to perform a desired manipulation task according to embodiments of the present invention. In some case, the robotic system 200 may be referred to as a robot.

The robotic system 200 includes a manipulator 210 and force sensors 2101 arranged on the manipulator 210 and a vision system 2102 (at least one camera). The force sensors 2101, which can be referred to as at least one force sensor, are configured to detect the force implemented by the manipulator 210 on the object at the point of contact between the object and the manipulator. The vision system 2102 may be at least one camera or cameras, depth cameras, range cameras or the like. The vision system 2102 is arranged at a position such that the vision system 2102 can observe the object state representing the positional relationship among the object, a table-top (not shown) and additional contact surface. The vision system 2102 is configured to estimate pose of objects on the table-top with an additional contact surface in the environment of the robotic system 200.

The vision system 2102 is configured to detect and estimate the pose of the objects to be manipulated on the table-top. The controller 205 is configured to determine whether the parts need to be re-oriented before they can be used for the desired task (e.g., assembly). The controller 205 is configured to compute a sequence of control forces applied to the object using the bilevel optimization algorithm. The robot 200 applies the sequence of control forces (sequence of the contact forces) to the object against the external contact surface according to the control signals transmitted from the interface device 230.

Further, the controller 205 is configured to acquire simulation data and learning data via the communication network 215. The simulation data and learning data generated in the computer (simulating computer system) 2500 are configured to be used in the robotic system 200. The collected simulation data and learning data are transmitted to the controller 205 via the communication network 215.

The controller 205 is configured to generate and transmit the control data including instructions with respect to the computed sequence of control forces to the low-level robot controller (e.g., an actuator controller of the manipulator) such that the instructions cause the manipulator to apply the computed sequence of control forces (contact forces) on the table-top. The robot 200 is configured to grasp the re-oriented parts so that they can be then used for the desired task (assembly or packing) on the table-top.

Figure 2B:
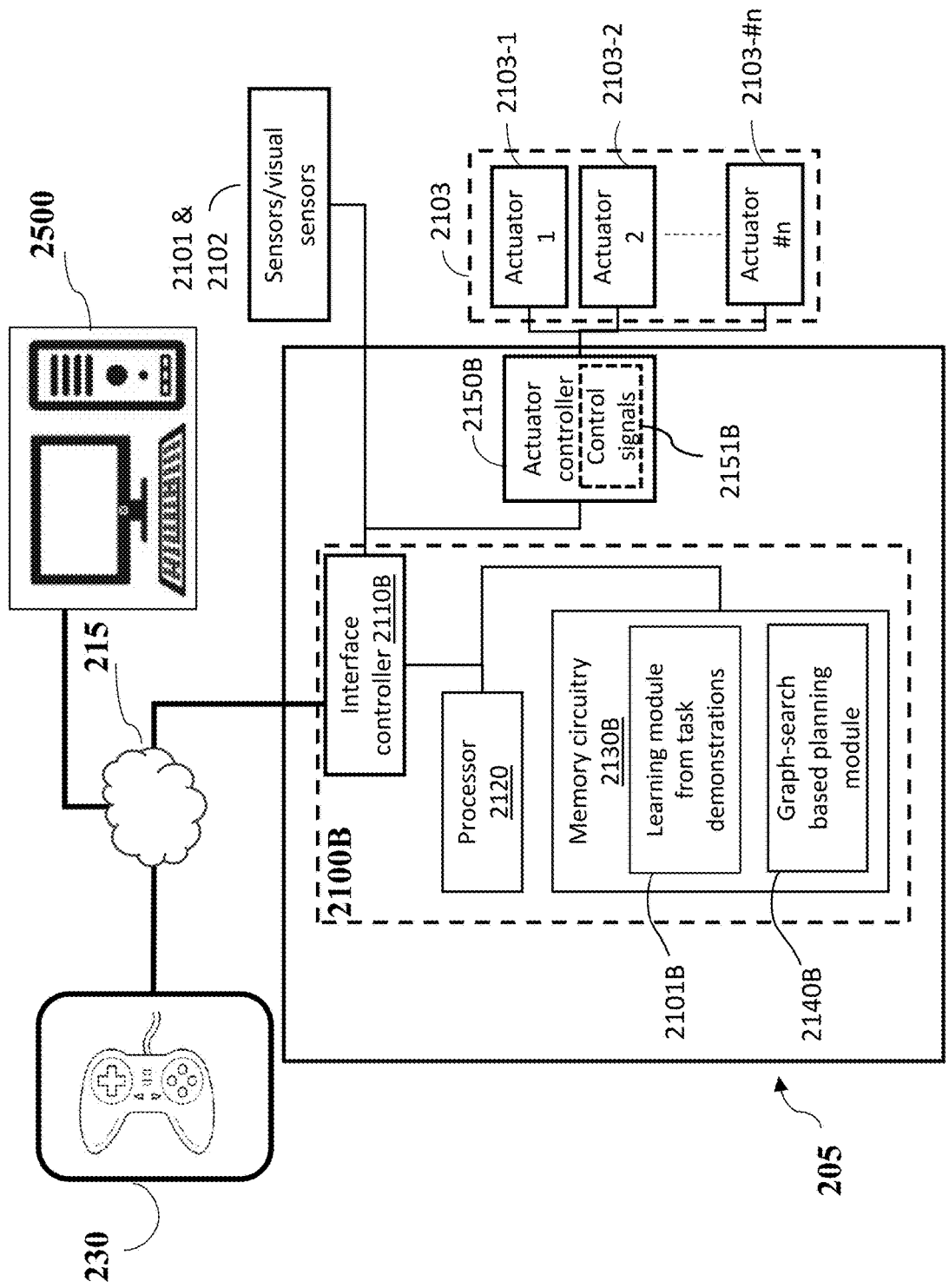
FIG. 2B shows a diagram illustrating the components of the controller connected to the interface devise, according to embodiments of the present invention.

FIG. 2B shows a robotic system (robot) 200 to manipulate objects on the table-top (not shown) according to a trajectory generated by the proposed robust trajectory optimization problem according to embodiments of the present invention. The robotic control system 2100 is configured to control an actuator system 2103 of the robot 2150. The robotic control system 200 may be referred to as a control system of a robot or a robotic controller.

The robotic control system 200 may include an interface controller 2110B, a control processor 2120 (or at least one control processor), and a memory circuitry 2130B. The memory circuitry may be referred to as a memory unit or a memory module, which may include one or more static random-access memories (SRAMs), one or more dynamic random-access memories (DRAMs), one or more read-only memories (ROMs), or combinations thereof. The memory circuitry 2130B is configured store a computer-implemented method including a learning from demonstration (LfD) module and a graph-search based planning module which can generate a feasible sequence of LfD skills (using the LfD module) to generate a feasible plan for a novel task. The processor 2120 may be one or more than one processor unit, and the memory circuitry 2130B may be memory devices, a data storage device, or the like. The interface controller (robotic interface controller) 2110B can be an interface circuit, which may include analog/digital (A/D) and digital/analog (D/A) converters to make signal/data communication with sensors 2101 including force sensors and vision sensor(s) 2102 and a motion controller 2150B of the robot 200. Further, the interface controller 2110B may include a memory to store data to be used by the A/D or D/A converters. The sensors 2101 are arranged at joints of the robot (robot arm(s) or manipulator) or picking object mechanism (e. g. fingers, end-effector) to measure the contact state with the robot. The vision sensors 2102 may be arranged in any positions that provide a viewpoint to observe/measure the object state representing the positional relationship among the object, the table-top, and additional contact surface.

The controller 205 includes an actuator controller (device/circuit) 2150B that includes a policy unit 2151B to generate action parameters to control the robotic 200 that controls the manipulator 210, handling mechanism or combinations of the arms 2103 including handling mechanism 2103-1, 2103-2, 2103-3 and 2103-#N, according to the number of joints or handling fingers. For instance, the sensors 2101 may include acceleration sensors, angle sensors, force sensors or tactile sensors for measuring object position as well as forces during external. For instance, the interaction between an object and a robot arm of the robotic system can be represented using complementarity constraints to capture the contact state between the object and the robot arm of the robotic system. In other words, the interactions are based on the contact state represented by the relation between a slipping velocity of the object on a table-top and the friction of the object with the table-top when the object is moved by the robot arm.

The interface controller 2110B is also connected to the sensors 2101 that measure/acquire states of the motion of the robot mounted on the robot. The motion sensors 2101 may be configured to measure sequence of forces applied to and the positions where the sensors are arranged on the robot. The positions are represented by a world coordinate frame 1010 in FIG. 10.

In some case, when the actuators are electrical motors, the actuator controller 2150B may control individual electric motors that drive the angles of the robot arms or handling of the object by the handling mechanism. In some case, the actuator controller 2150B may control the rotations of individual motors arranged in the arms to smoothly accelerate or safely decelerate the motion of the robot in response to the policy parameters generated from the computer-implemented method 2000 for learning sequences for robotic tasks stored in the memory circuitry 2130B includes a learning module 2101B for LfD and a graph search-based planning module 2140B for control signals. Further, depending on the design of the object handling mechanism, the actuator controller 2150B may control the lengths of the actuators in response to the policy parameters according to the instructions generated by the computer-implemented method 2000 stored in the memory circuitry 2130B.

The controller 205 is connected to an imaging device or vision sensors 2102 which provides RGBD images. In another embodiment, the vision sensors 2102 can include a depth camera, thermal camera, RGB camera, computer, scanner, mobile device, webcam, or any combination thereof. In some cases, the vision sensors 2102 may be referred to as a vision system. The signals from the vision sensors 2102 are processed and used for classification, recognition or measuring the state of the objects 220.

Figure 3:
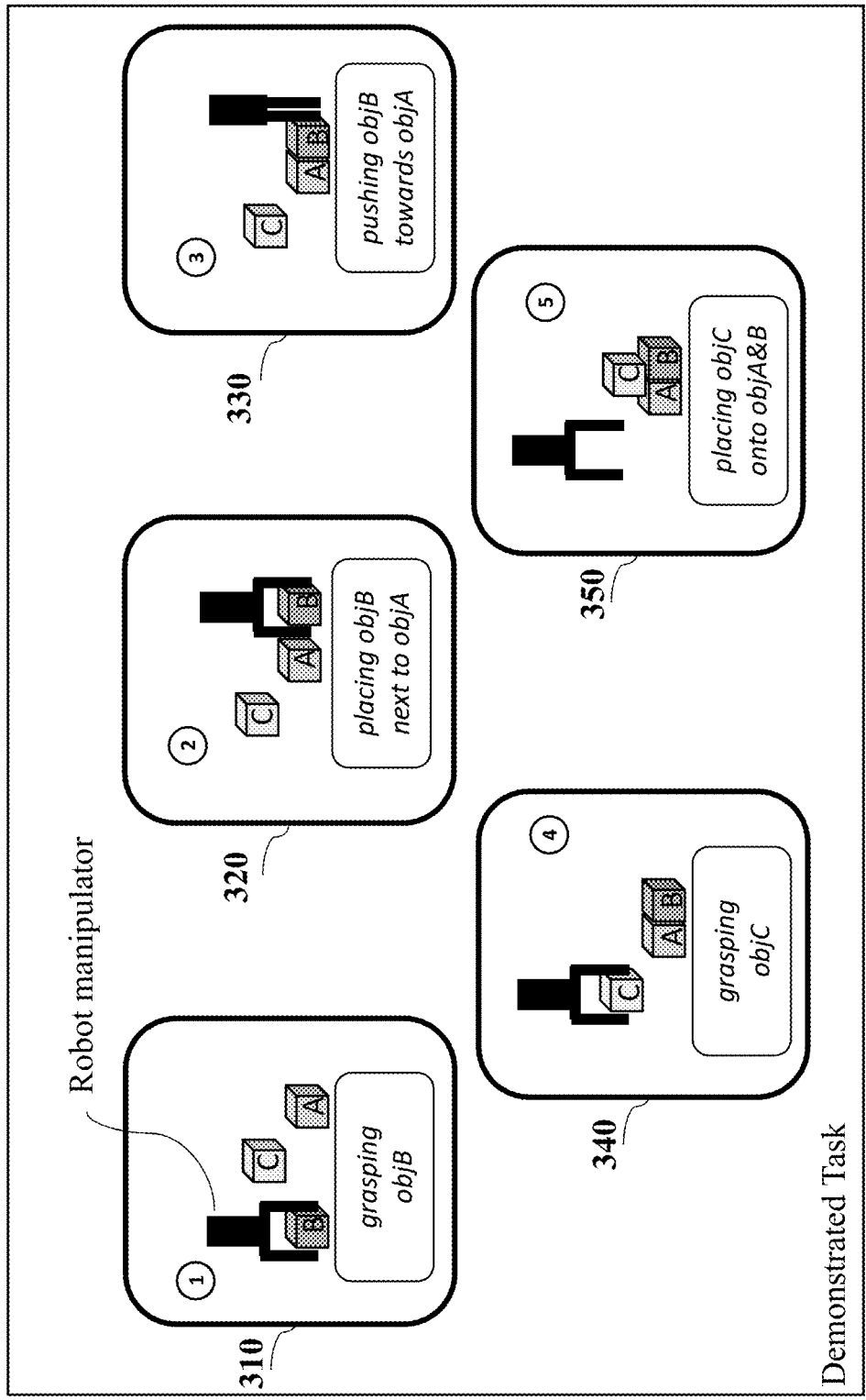
FIG. 3 shows a schematic representation of how a certain task could consist of different subtasks which are the different segments that the proposed method extracts while the learning procedure, according to embodiments of the present invention.
Figure 3:
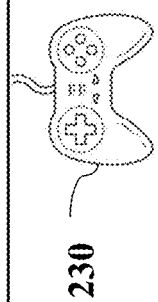

It is noted that there are no labels are available for the different segments of the demonstration trajectories. The different segments represent the different (sub)tasks which need to be performed sequentially for success of the entire long-horizon task which is a composition of these short-horizon tasks. Note that each of these subtasks need to be implemented robustly to be able to complete the entire long-horizon task. FIG. 3 shows a possible sequence of subtasks which could be implemented to finish the block stacking task for the goal configuration.

For example, there are five subtasks in the block stacking task using the interface device 230 operated by a user, as shown in FIG. 3. In this case, the user operates the robot manipulator using the interface device 230 as follows. In the first step 310, the robot grasps object B. In step 320, the robot manipulator places the object B next to object A in step 320. In the next step, the robot manipulator pushes object B next to object A in step 330 so that object A and B are in contact. Then the robot manipulator grasps object C in step 340. Finally, the stacking is completed by placing object C over object A and object B 350. Note that this is one possible sequence of operations that could be demonstrated during the learning phase of a robot task. The user can demonstrate any other feasible sequence of subtasks that can be used to successfully complete the task. However, the user/operator needs to provide the same demonstration multiple times. During these multiple demonstrations, the initial state of the blocks and the robot could be different.

A task can be demonstrated either directly on the robot using teleoperation or moving the robot using a kinesthetic controller 205 configured to move the robot manipulator 210. For teleoperation of the robot, a human expert might use one of the several possible joystick interfaces to move the robot 210 during the task. FIG. 2A shows several different joystick interfaces that can be used to move the robot during a demonstration. For example, a human can either use one of the joysticks 240 or 250 to control the motion of the robot during demonstration. It is also possible that a human can use Virtual reality controllers 260 with a virtual reality setup to demonstrate a trajectory for moving the robot 210 (either physically or collect data in virtual reality). These teleoperations interfaces could be used to move the robot 210 to demonstrate a desired task like stacking a set of blocks in a certain fashion 220. The desired task can be referred to as a planned task. While each of the tasks is demonstrated, data of demonstration trajectories with respect to each task are acquired via the sensing system including the sensors 2101 and visual sensors 2102 into the memory circuitry 2130B. In another option a human can also try to directly move the robotic arm 210 using a kinesthetic mode that might be available on the robot to move the robot 201.

Figure 4:
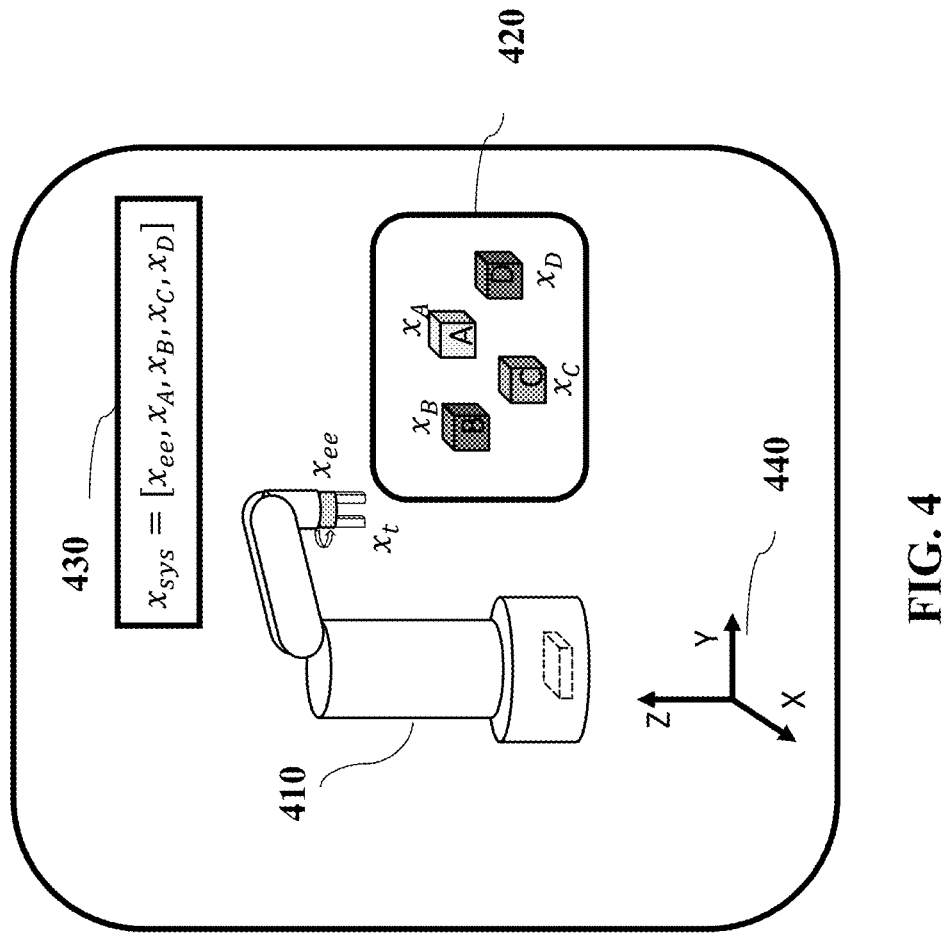
FIG. 4 shows a schematic representation of the state for the block stacking task and the world coordinate frame to measure the states, according to embodiments of the present invention.

FIG. 4 shows a schematic representation of the state for the block stacking task and the world coordinate frame to measure the states, according to embodiments of the present invention. For the case of block stacking task shown in FIG. 4, the state 430 of the system is a concatenation of the states of the manipulator 410 and the blocks 420 measured in a fixed frame 440. The state of the manipulator is represented as the state of the end-effector $x_{ee}$. Similarly, the states of the blocks A,B,C and D are denoted as $x_A$, $x_B$, $x_C$, $x_D$ which could represent the pose of the blocks in the fixed frame 440.

Some embodiments of the current disclosure are based on the realization in the absence of any labels for the demonstrated trajectories, we will have to design a metric which can be used to consistently segment/divide the demonstration trajectories into different subtasks represented by the segmented trajectories. However, to determine different segments of the demonstration trajectories, we design a metric that can be used to segment/divide the demonstrated trajectories. Note that both the number of segments as well as the metric for segmentation of the trajectories are both unknown. Thus, to allow segmentation of the demonstrated trajectories, we first perform feature extraction and then use a metric using these features to perform segmentation of trajectories into different components.

For feature extraction in the current work, we simply convert the pose data of the robot as well as the objects in the frame of reference of different objects. This can be achieved by applying the right transform to convert the observation of all the data in different frames and use that as features.

Frames are used to define the coordinate system that a robot can use to measure its own position as well as know the position of objects in the work environment of the robot. Features are the functions of the measurements or observations that are used to train a machine learning model. Some embodiments of the current disclosure are based on the realization that different demonstration trajectories can be transformed in various different frames which could be attached to different objects in the work environment of the robot. Feature selection is performed using a user-defined function or cost function representing the purpose of feature selection. In cases of supervised learning, this can be performed using a metric like maximum classification accuracy, for example. However, in the present disclosure, there are no labels, and the feature selection is performed using an unsupervised learning cost function. This could be a convex sum of number of segments obtained by a feature and the maximizing the segmentation metric (which is described in FIG. 5).

Figure 5:
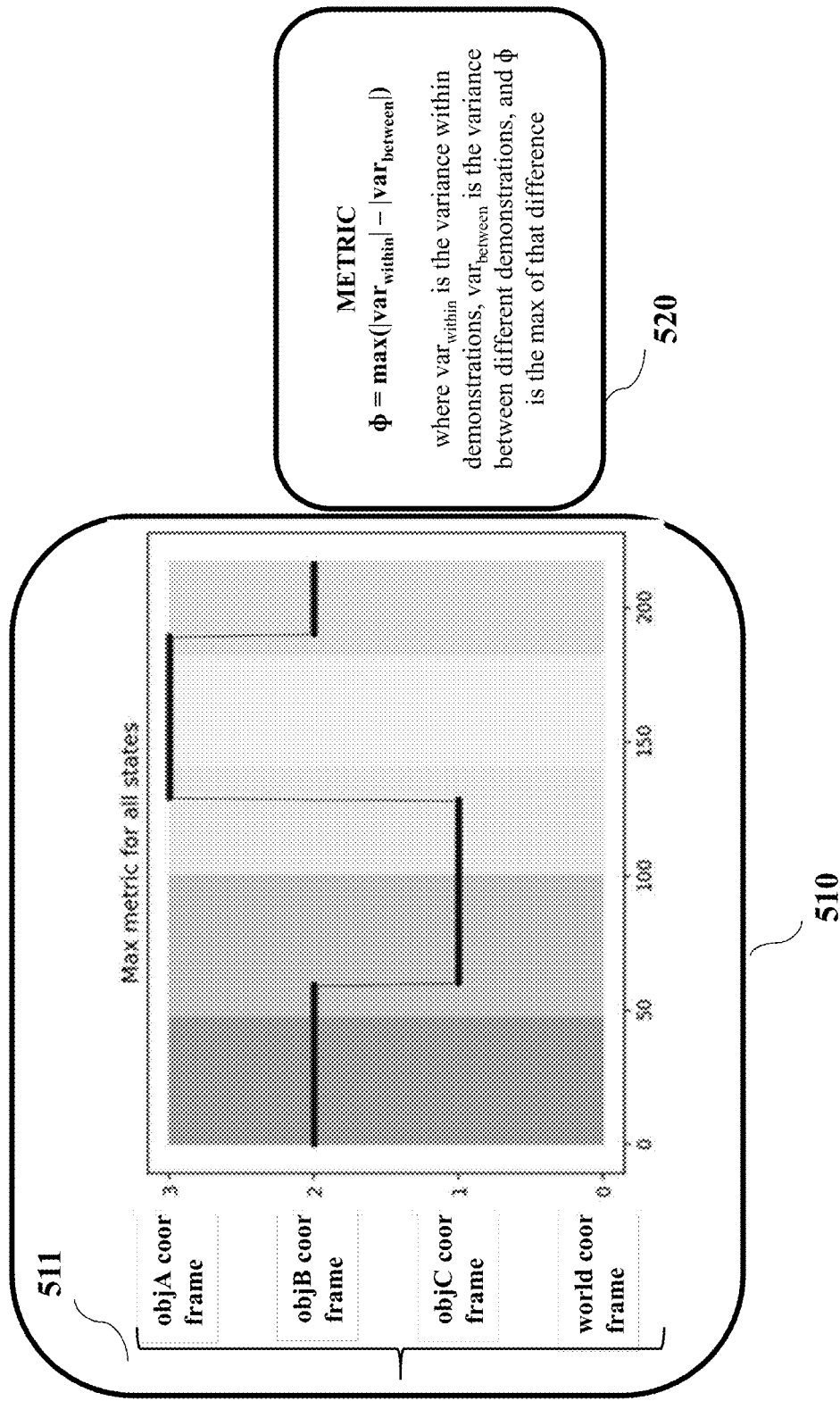
FIG. 5 shows a schematic for a metric used for segmenting tasks into different trajectories and a corresponding example, where different features are required to segment the trajectory, according to embodiments of the present invention.

FIG. 5 indicates the metric that we propose in this work for segmentation of the demonstrated trajectories. FIG. 5 shows the metric for segmentation of trajectories in 520. An example for how to use the metric 520 for segmentation of trajectories is shown in 510. FIG. 5 also shows the different features that are useful for segmentation of the demonstration trajectories 511. As shown in the metric 520, we use the maximum of the different features to segment/divide the demonstration trajectories.

In FIG. 5, we show the different features which are transformed in the frame of reference of the different blocks in the scene. For example, objA coordinate frame represents the data in the frame of reference of object (or block) A in 310. Similarly, objB coord frame and objC coord frame represents the reference frames wrt the objects B and C. The measurements could be made directedly in these frames or could be converted after collection using the transform between the global frame of reference and the individual object frames of reference.

Once the demonstration trajectories are segmented into different parts (primitive trajectories correspond to dynamic motion primitives) using the metric presented in 520, we fit a representative motion model in each of the segmented trajectories.

Figure 6:
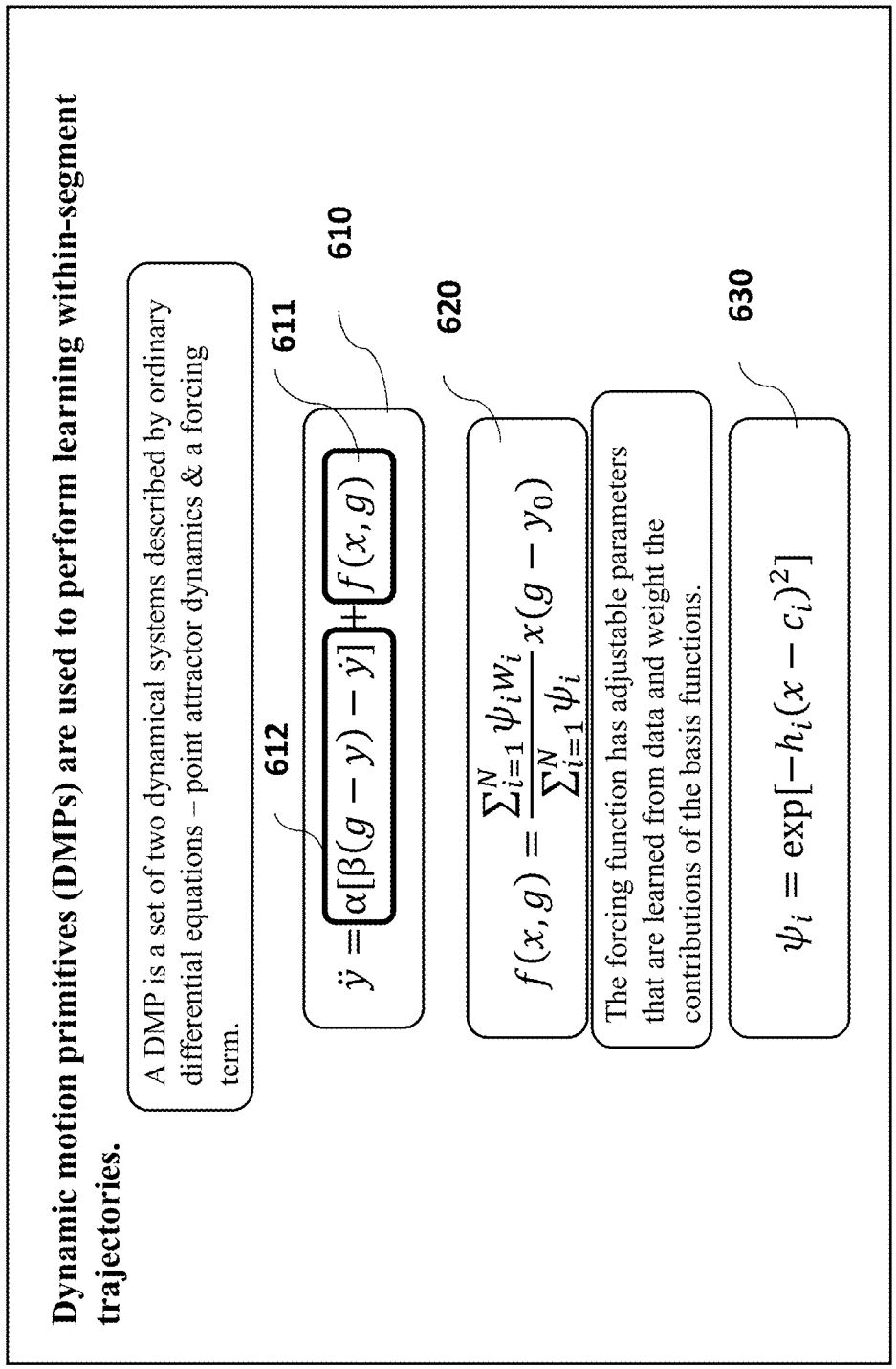
FIG. 6 shows a schematic for dynamic movement primitives (DMPs) used in the proposed work for learning different skill representations, according to embodiments of the present invention.

In this disclosure, we use dynamic movement primitives (dynamic motion primitives) or DMPs to represent each of the segmented trajectories. FIG. 6 shows a schematic for dynamic movement primitives (DMPs) used in the proposed work for learning different skill representations, according to embodiments of the present invention. We will describe them here for completeness as well. A DMP is a set of two dynamical systems described by ordinary differential equations—point attractor dynamics & a forcing term.

To remove explicit time dependency, they use a canonical system to keep track of the progress through the learned behavior:

$$\tau \dot{s} = -\alpha\_s \, s$$

where s=1 at the start of DMP execution (and $\alpha\_s > 0$) and $\tau > 0$ specifies the rate of progress through the DMP.

To capture attraction behavior for the point attractor dynamics & a forcing term, DMPs 610 use a spring-damper system 612 (the transformation system) with an added nonlinear forcing term 611. Writing the DMP equations as a system of coupled first-order ordinary differential equations (ODEs) yields:

$$\tau \dot{z} = \alpha_z(\beta_z(g-y)-z) + f(s)$$

$$\tau \dot{y} = z$$

where g denotes the goal pose. The forcing function has adjustable parameters that are learned from movement primitive data and weight the contributions of the basis functions. The forcing term is defined as a radial-basis function 620:

$$f(s, g) = \frac{\sum_{i=1}^{N} \psi_i w_i}{\sum_{i=1}^{N} \psi_i} s(g - y_0)$$

$$\psi_i(s) = \exp\{(-h_i(s - c_i)^2)\}$$

where $h_i$ and $c_i$ denote the width and center of the Gaussian basis functions 630, respectively. The forcing term is learned from the demonstration by solving a locally weighted regression to fit the demonstration data given by the expert.

Figure 7:
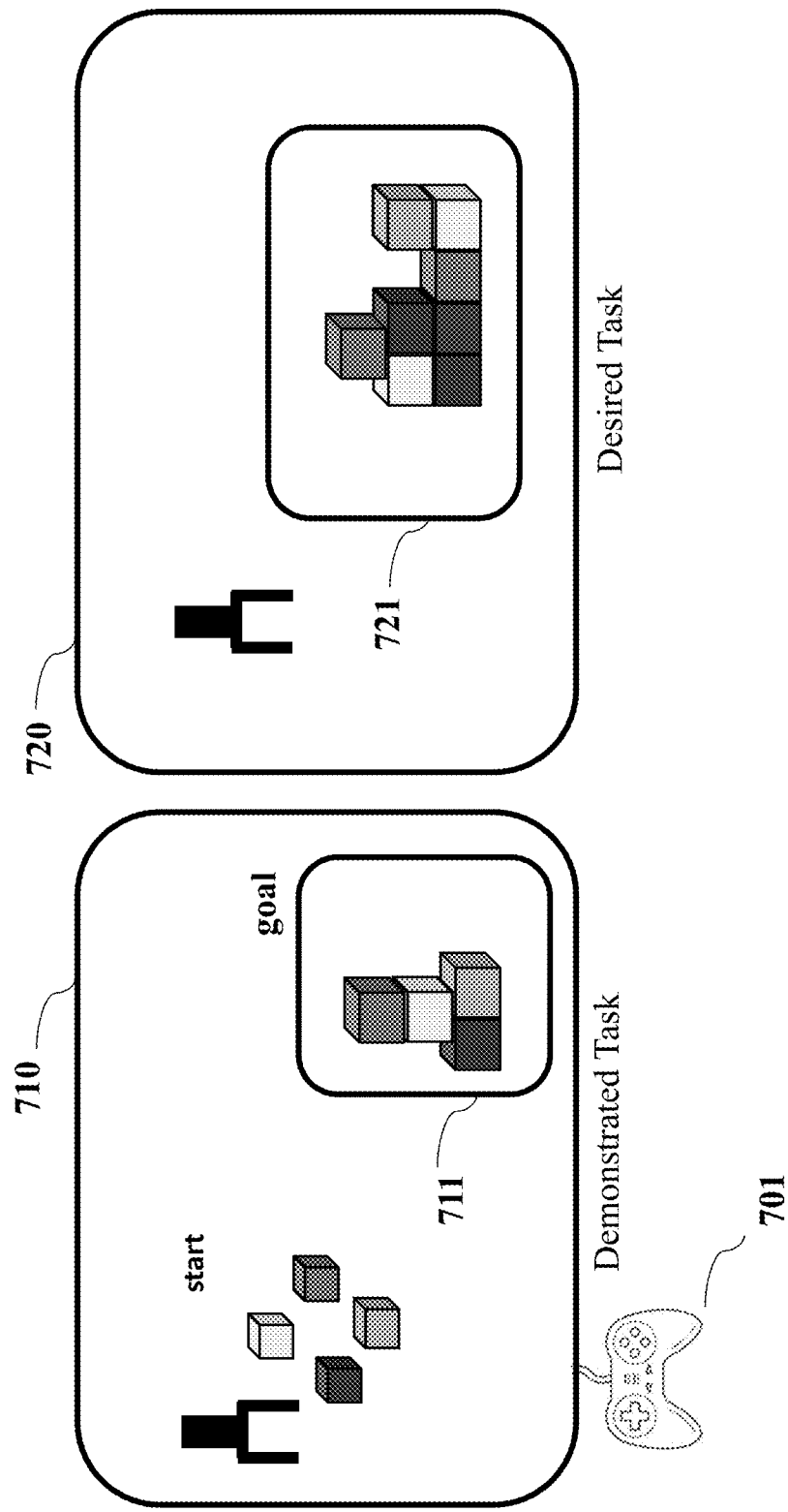
FIG. 7 is a schematic illustrating the skills learned from an original demonstrated task required to be implemented for a desired task being not shown during demonstrations.

Using segmentation of trajectories into individual components, and fitting each of the individual segments we can reproduce any expert demonstration for a task. However, if the desired task is different from the demonstrated task, then the described method falls short for performing the task. FIG. 7 shows a scenario where the robot is demonstrated to perform a task 710 using an interface device 701. The goal of this task 711 is very different from the goal 721 of the desired task 720. In these cases, we need an algorithm that can help us sequence the learned subtasks so that the robot can successfully perform the desired task 720.

Figure 8:
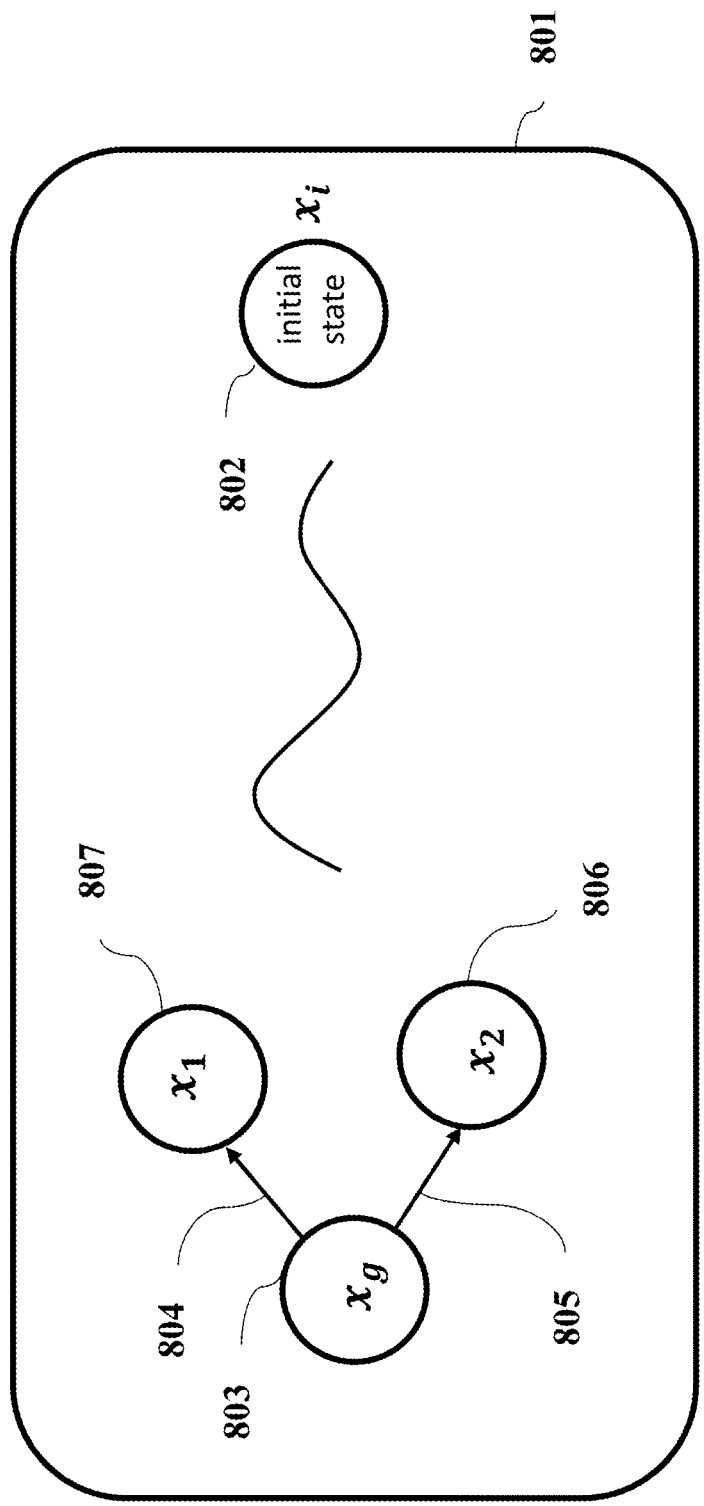
FIG. 8 shows a planning graph used in some embodiments of the present invention, where the initial node is the goal state of the task and additional nodes are added.

Some embodiments of the disclosure are based on the realization that a graph search-based planning algorithm could be used to help plan for tasks that were not demonstrated during training to the robot. FIG. 8 shows a planning graph used in some embodiments of the present invention, where the initial node 802 is the goal state of the task and additional nodes are added. In this case, we introduce a graph-search based planning approach 801 which also reasons about the feasibility of actions to find a feasible path to perform a novel task which was not demonstrated during training. In graph-search based planning approach, an initial node is the goal node for the task. Then we keep adding edges and nodes to this graph from the existing set of nodes and the feasible actions from all such nodes. For example, in goal node 803, the robot can only take two feasible actions 804 and 805 leading to states 806 and 807. Similarly, we add feasible actions from all other nodes and add the corresponding edges and vertices to the set. This process is terminated when we either reach the initial state of the system or no solution could be found. It is noted that the actions available to the robot while graph construction processes are the individual DMPs that were learnt by the robot by segmentation of demonstration trajectories. In the graph search-based planning, the robot is simply constructing a feasible graph where it can use the learned DMPs in a different sequence to perform a novel task that was not seen during demonstration.

Figure 9:
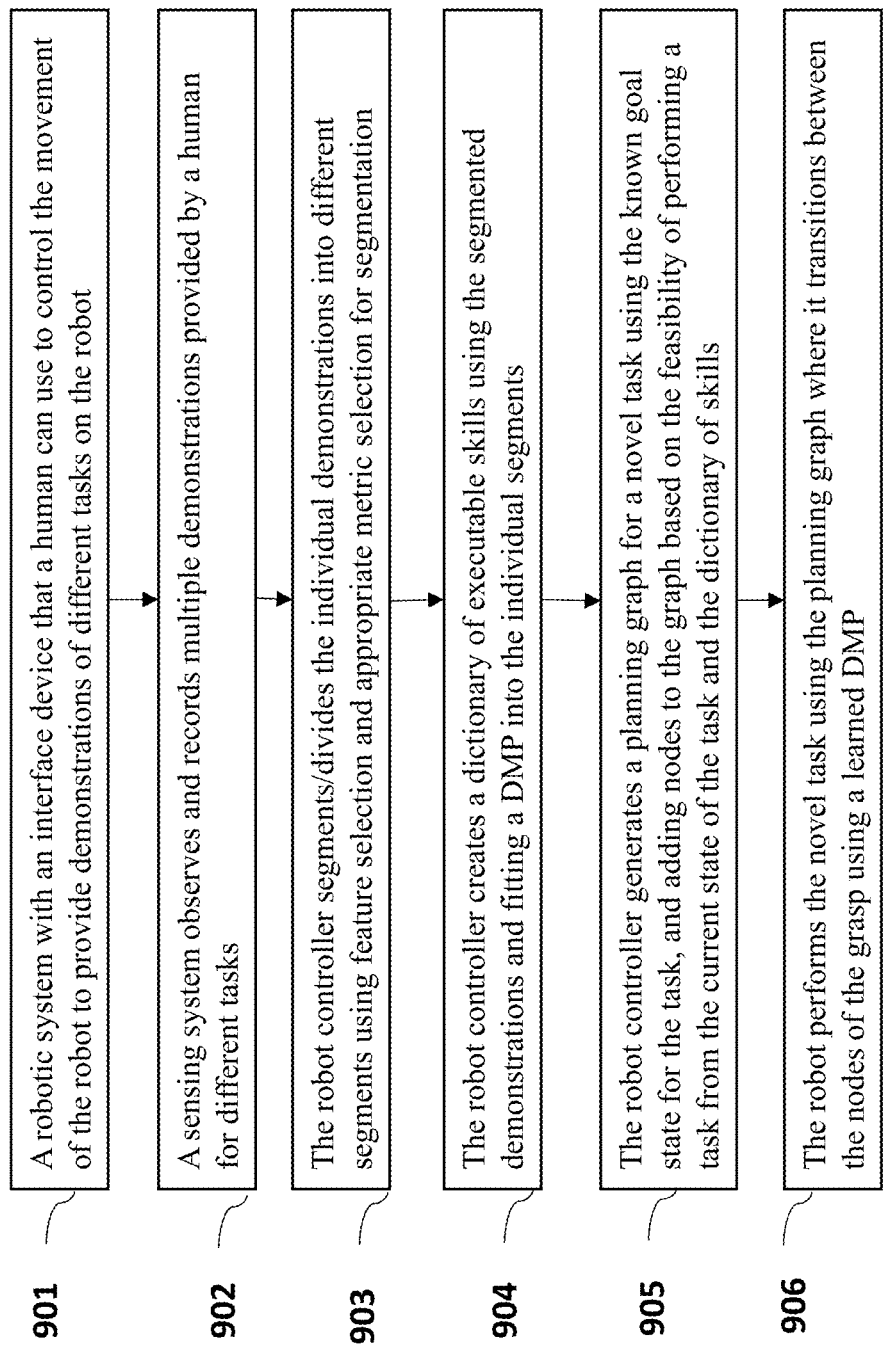
FIG. 9 shows a flowchart indicating the sequential steps implemented in some embodiments of the present invention.

FIG. 9 shows the overall method for learning and task performance presented in this disclosure. A robotic system which is equipped with an interface to provide demonstrations and collect demonstration data is used to provide demonstration of different tasks on the robot 901. A sensing system including motion sensors 2101 and vision sensors 2102 is used to observe and record the demonstration trajectories 902 as demonstration data. In the learning processes, training demonstration tasks are performed and the demonstration data of the training demonstration tasks are collected and stored into a dictionary arranged in the memory circuitry 2130B as collected demonstration data. A robot controller segments the individual demonstrations into different segments using feature selection (feature selection method) and appropriate metric selection (a segmentation metric) for segmentation 903.

FIG. 5 shows the metric used in the proposed work for segmentation of trajectories. In particular, the metric is defined as follows:

$$\Phi = \max(|\text{var}_w| - |\text{var}_b|)$$

Where, $\text{var}_w$ is the variance within a single demonstration and $\text{var}_b$ is the variance between demonstrations. And the metric $\Phi$ is the maximum of the difference between the variances. This metric is computed for the feature selected for learning the different segments of demonstration. Feature selection (feature selection method) in the present disclosure could be performed using a cost function which is a convex sum of the number of segments obtained by a feature and the maximizing the segmentation metric (explained above).

The robot controller creates a dictionary of executable skills (trajectories) using the segmented demonstrations and fitting a DMP into the individual segments 904. The robot controller generates a planning graph for a novel task using the known goal state for the task, and adds nodes to the graph based on the feasibility of performing a task from the current state of the task and the dictionary of skills 905. The robot performs the novel task using the planning graph where it transitions between the nodes of the graphs using a learned DMP 906.

Figure 10:
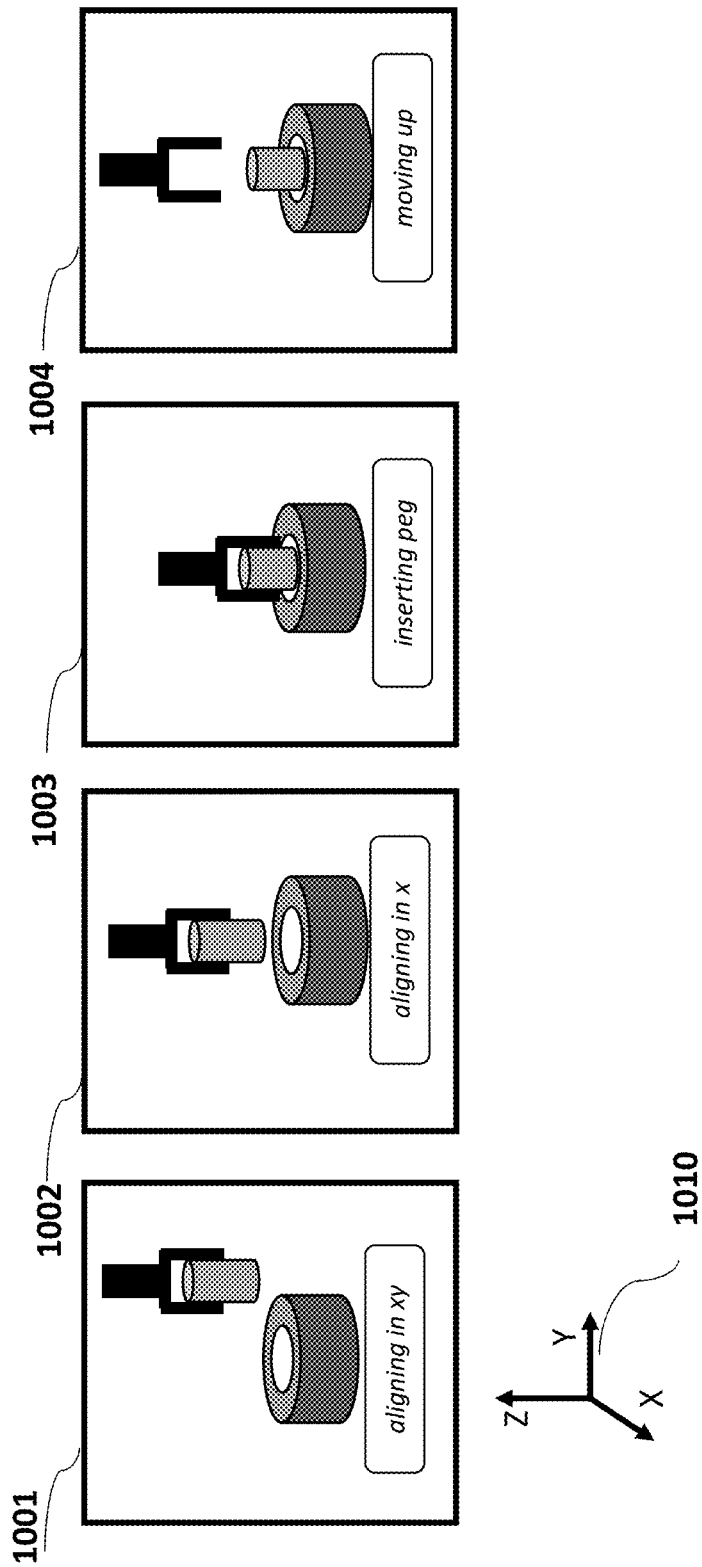
FIG. 10 shows a schematic illustrating the segmentation of a peg-in-hole demonstration task consisting of multiple steps for precise operation, according to embodiments of the present invention.

The proposed method in this disclosure could be used to perform a lot of tasks like assembly which consists of a lot of steps that needs to be done in a particular order. FIG. 10 shows a task of peg insertion which can be performed using the proposed approach of providing a demonstration, sequencing it into different components (segmented trajectories) and then, fitting a DMP into each of the components. A possible sequence of motions using the robot (an end-effector of a robot) is shown in FIG. 10, where the robot might need to align the peg in the XY 1001 plane, then aligns it in a particular axis (say X 1002). After that the robot can insert the peg 1003, the robot retracts the end-effector of the robot in 1004. Note that all these demonstrations can be recorded in a suitable frame 1010. The proposed technique could be used to create programming-less systems for performing complex tasks using robotic systems.

According to an embodiment of the present invention, the method for learning and task performance described above is performed by the simulating computer system 2500. The simulating computer system 2500 is configured to create a simulation environment corresponding to the physical environment of the robotic system 200 and collect the demonstration data generated by moving the robot in the simulation environment to achieve the tasks/training above using interface devices including a joystick or a virtual reality or augmented reality interface. Once the simulating computer system 2500 collects the demonstration data and/or the learning data, those data are transferred to the controller 205 of the robotic system 200 via the communication network 215. The robotic system 200 is configured to use the data to perform the desired task/the planned task or perform further training using the real parts using the manipulator of the robotic system 200 to improve the performance of the manipulation of the robotic system 200.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. A robotic controller, comprising:
a memory circuitry storing instructions; and
at least one control processor configured to:
   acquire demonstration data of a plurality of demonstration tasks;
   segment the demonstration data of the plurality of demonstration tasks into multiple segments by selecting features from the demonstration data based on a feature selection method and using a segmentation metric, wherein each segment of the multiple segments represents a subtask associated with a corresponding demonstration task of the plurality of demonstration tasks, and wherein the segmentation metric represents a variance between different demonstrations and within an identical trajectory;
   generate dynamic movement primitives (DMPs) based on the multiple segments, wherein each dynamic movement primitive (DMP) of the DMPs corresponds to a corresponding segment of the multiple segments;
   generate a planning graph by searching a feasible path of at least one object for a desired task, wherein the desired task is represented by an initial state and a goal state with respect to the at least one object;
   parameterize the feasible path based on at least one DMP of the DMPs using the initial state and the goal state; and
   implement the parameterized feasible path as a trajectory of a robot by tracking and following the parameterized feasible path for the desired task.

2. The robotic controller of claim 1, wherein the at least one control processor is further configured to: store the DMPs in a dictionary and update the dictionary by adding the parameterized feasible path.

3. The robotic controller of claim 1, wherein the at least one control processor is further configured to detect features from the demonstration data of the plurality of demonstration tasks based on a first metric of providing maximum separation between the multiple segments of the demonstration data.

4. The robotic controller of claim 1, wherein each DMP of the DMPs is learned for each segment of the multiple segments of the demonstration data and parameterized on the goal state and the initial state for the desired task.

5. The robotic controller of claim 1, wherein the at least one control processor is further configured to generate state transitions between the initial state and the goal state for the desired task.

6. The robotic controller of claim 1, wherein each DMP of the DMPs is stored as a skill representation for a corresponding task.

7. The robotic controller of claim 1, wherein the at least one control processor is further configured to generate control policies for a novel task using the planning graph for the desired task and fitting a DMP of the DMPs between different nodes of the planning graph.

* * * * *